United States Patent
Abe et al.

[15] 3,658,055
[45] Apr. 25, 1972

[54] AUTOMATIC ARRHYTHMIA DIAGNOSING SYSTEM

[72] Inventors: Zenmon Abe; Takaji Suzuki; Masayuki Tsuneoka, all of Kokubunji-shi; Eiichi Kimura, Tokyo; Teizo Akazome, Tokyo; Kanji Obayashi, Tokyo; Gengo Kasai, Tokyo, all of Japan

[73] Assignee: Hitachi, Ltd., Tokyo, Japan

[22] Filed: Apr. 11, 1969

[21] Appl. No.: 815,291

[30] Foreign Application Priority Data

May 20, 1968 Japan..................................43/33600

[52] U.S. Cl. .........................................................128/2.06 A
[51] Int. Cl. ...............................................................A61b 5/04
[58] Field of Search ....................128/2.05 P, 2.05 S, 2.05 T, 128/2.06 A, 2.06 F, 2.06 R

[56] References Cited

UNITED STATES PATENTS

3,216,261  11/1965  Brown et al. .......................128/2.05 P
3,554,187  1/1971  Glassner............................128/2.06 A
3,438,367  4/1969  Karsh et al.........................128/2.06 A
3,510,765  5/1970  Baessler............................128/2.06 A
3,518,983  7/1970  Jorgensen.........................128/2.06 A

*Primary Examiner*—William E. Kamm
*Attorney*—Craig, Antonelli and Hill

[57] ABSTRACT

An automatic arrythmia diagnosing system for diagnosing heart disease employs a plurality of detector elements for detecting both the components and the time interval between components of the portions of an electrocardiagraph wave. The values of cardiac potentials which are detected during one cardiac cycle are compared with those of a later cardiac cycle when the frequency of the presence of the arrhythmia is high. The number of cardiac potentials of a cardiac cycle is averaged over a predetermined number during an earlier cardiac cycle when the frequency of the presence of arrhythmia is low. Digital logic circuitry is employed to be responsive to code signals representative of various portions of the electrocardiagraph signal to produce signals indicative of different forms of heart disease.

13 Claims, 28 Drawing Figures

FIG. 2b DDQS SIGNAL

FIG. 2c QRSS SIGNAL

FIG. 2d QTE SIGNAL

FIG. 2e FF1 SIGNAL

FIG. 2f

FIG. 2g DDQS-P SIGNAL

AUTOMATIC ARRHYTHMIA DIAGNOSING SYSTEM

BACKGROUND OF THE INVENTION

1. Field of the Invention

The present invention relates to a system for diagnosing arrhythmia resulting from irregularity of stimulation generated at the sinus node of the heart, generation of stimulation at a part other than the sinus node, or disorder of an excitation conduction system.

2. Description of the Prior Art

Heretofore, diagnosis of arrhythmia has been done on the basis of an electrocardiogram corresponding to each cardiac cycle or heart beat. However, for this diagnosis an accumulation of knowledges and experiences has been necessary for a long time, and this diagnosis is one of the perplexing ones among the usual clinical examinations.

Therefore, it has been desired to exploit apparatuses for automatically diagnosing arrhythmia by employing the recent electronic technology.

SUMMARY OF THE INVENTION

It is an object of the present invention to provide an apparatus for diagnosing arrhythmia by the presence of the basic rhythm of cardiac action with respect to the case where arrhythmia occurs frequently and the case where the frequency thereof is low.

Generally, as modes of arrhythmia there are two cases where disorder of stimulation or conduction of excitation occurs frequently and where the frequency thereof is low. In the former case disorderly cardiac action is detected by simultaneously analyzing electrocardiograms for several cardiac cycles, and in the latter case by first detecting information concerning electrocardiograms representing the basic rhythm of cardiac action that the stimulation generated at the sinus node is transmitted to the atrium, atrio-ventricular node, and finally to the ventricle, and by comparing each cardiac action with the said information.

Therefore, when the frequency of arrhythmia is low, it is necessary to know the interval between R-waves (hereinafter referred to as RR interval), the interval between P-wave and Q-wave (hereinafter referred to as PQ interval), and the width of QRS wave (hereinafter referred to as QRS duration) of the said basic cardiac cycle (or heart beat). However, since these values more or less vary in each cardiac cycle, it is necessary to obtain average values thereof over several cardiac cycles.

For this reason, in the present invention, since in a normal cardiac cycle one P-wave is included and the QRS duration is substantially equal to the preceding one, a cardiac cycle including one P-wave and such QRS duration is regarded as a basic cardiac cycle. Cardiac cycles are classified according to the values of RR intervals, and the mean values of the RR interval, PQ interval, and QRS duration are sought for each RR interval. At the same time the total number of cardiac cycles and classified outputs of the values of the RR intervals are counted, and the presence of the basic rhythm is determined according to whether or not approximately 20 to 30 percent of the total number of cardiac cycles falls in the same classified RR interval.

BRIEF DESCRIPTION OF THE DRAWINGS

Some embodiments of the present invention will now be described with reference to the accompanying drawings, in which:

FIGS. 5 to 9b are block diagrams of various parts of the embodiment of FIG. 1;

FIG. 16 is a table utilized for diagnosis of arrhythmia according to the invention.

DESCRIPTION OF THE PREFERRED EMBODIMENT

Figure 1A:
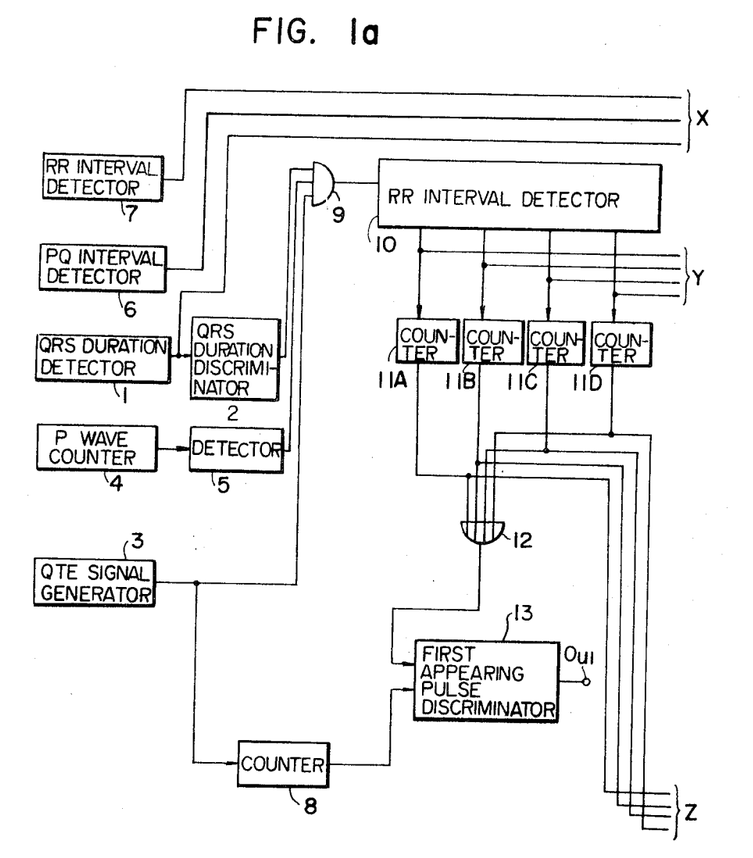
FIGS. 1a and 1b are a two-part block diagram of a significant part of an embodiment of the invention.
Figure 2A:
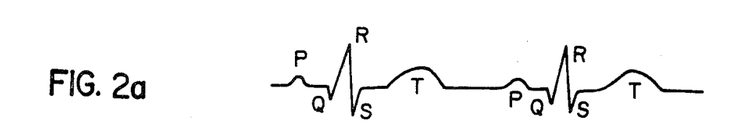
FIGS. 2a to 2g are waveforms for explaining the invention.
Figure 2B:
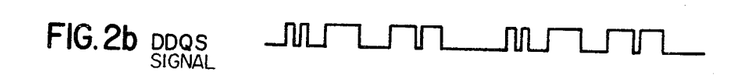
Figure 2C:
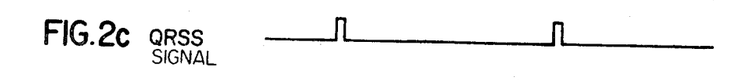

Referring to FIG. 1a, which is the left-hand portion of the block diagram showing a significant part of the system according to the invention for detecting the presence of a basic rhythm from the number of P-waves and the QRS duration and, when the basic rhythm is present, for obtaining the RR interval, PQ interval, and QRS duration thereof, reference numeral 1 designates a QRS duration detector for detecting the width of a QRS wave in an electrocardiographic signal. For this QRS duration detector 1 a signal described in the copending U.S. Pat. application Ser. No. 815,305, filed Apr. 11, 1969 entitled "E.C.G. Processing System," that is, a signal as shown in FIG. 2a is utilized. The cardiac potential of FIG. 2a is first differentiated by a differentiator, and then fed to Schmitt trigger circuits having positive and negative thresholds. An output of the Schmitt trigger circuit having a negative threshold is inverted in its polarity. These inverted and non-inverted outputs are fed to an OR circuit, the fall portion of the output of which is delayed to obtain a square wave signal (hereinafter referred to as DDQS signal) corresponding to P-wave, QRS wave and T-wave in the said cardiac potential as shown in FIG. 2b. On the other hand, by utilizing the fact that the peak of the differentiated cardiac potential obtained by differentiating the said cardiac potential surely lies on the QRS wave (since the variation of the QRS wave is most abrupt among waves in the cardiac potential as is understood from the waveform of FIG. 2a, the largest differential is at the QRS wave) the peak value is detected. The detected peak value is converted into a signal having a magnitude of 60 to 70 percent of the peak value, which signal is utilized to operate a pulse signal oscillator to obtain a square wave signal as shown in FIG. 2c (hereinafter referred to as QRSS signal). Then the coincidence of the DDQS and QRSS signals is taken at an AND circuit. Finally by controlling the integration of an interval integrator for producing sawtooth waves with the rise and fall portions of the coincident DDQS signal and by sampling and holding an output voltage from the integrator a voltage proportional to the width of the QRS wave can be obtained. The difference between a QRS duration derived from the QRS duration detector 1 and the QRS duration of the preceding cycle does not exceed 20 msec. in the case of the normal cardiac cycle.

Figure 3:
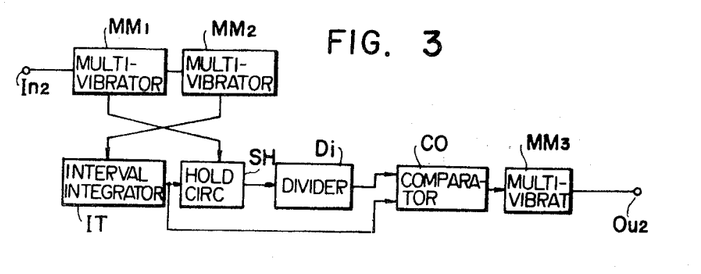
FIG. 3 is a block diagram of a signal generator utilized in the present invention.

Numeral 2 designates a QRS duration discriminator adapted to feed as an input a voltage corresponding to 20 msec. and an output voltage from the QRS duration detector 1 to a comparator and as another input of the comparator the next output voltage of the QRS duration detector 1. Numeral 3 designates a QTE signal generator for generating a pulse signal (hereinafter referred to as QTE signal) representing the time QT from a Q-wave to a T-wave to indicate the completion of each cardiac cycle. The construction of the QTE signal generator 3 is shown in FIG. 3. Since the time from a Q-wave to a T-wave can physiologically be represented by the formula $$QT_n = 0.2\, RR_{n-} + 0.12\ (\text{sec.})$$

where $QT_n$ : QT time of $n$th cardiac cycle, $RR_{n-1}$ : time interval between R-waves of $(n-1)$th and $n$th cardiac cycles, a pulse signal generated after the lapse of this time is a QTE signal.

Figure 4A:
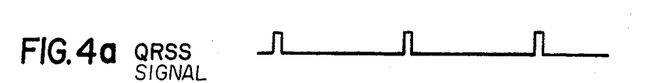
FIGS. 4a to 4e are waveforms for explaining the operation of the signal generator of FIG. 3.
Figure 4B:
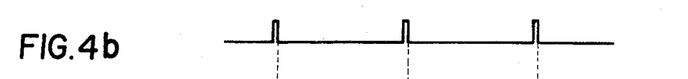
Figure 4C:
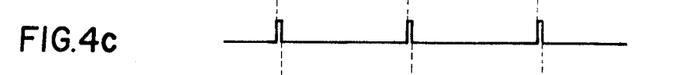
Figure 4D:
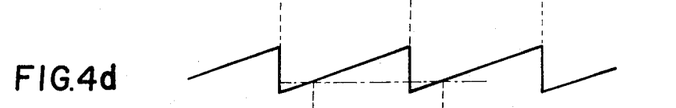
Figure 4E:
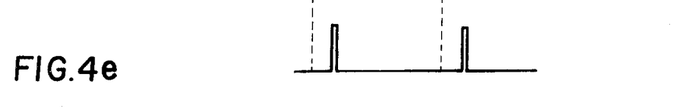

In the QTE signal generator of FIG. 3 a QRSS signal as shown in FIG. 4a is fed to a monostable multivibrator $MM_1$ through an input terminal $In_2$ to generate a pulse signal as shown in FIG. 4b. An output of the multivibrator $MM_1$ is fed to a sample hold circuit SH. As a result a pulse signal as shown in FIG. 4c is generated by the multivibrator $MM_2$, and resets an interval integrator IT for sawtooth wave generation, the operation of which is instantaneously interrupted as shown in FIG. 4d. The voltage at that time (the peak voltage) is held by the sample hold circuit SH, and then the integrator IT is reset to initiate the next integration operation. The voltage held in the hold circuit SH is transformed into a voltage of 0.2 times the peak value at a divider $D_i$ to be fed to a comparator CO. Another input signal of the comparator CO is an output signal from the integrator IT. When this output signal reaches a value of 0.2 times the total integrated value, the comparator CO delivers an output to a monostable multivibrator $MM_3$. If the multivibrator $MM_3$ is set so as to have a duration of 0.12 sec., a pulse signal as shown in FIG. 4e is generated by the multivibrator circuit $MM_3$ after a time of 0.12 sec. has elapsed from the generation of the output of the comparator CO. Thus, a pulse signal satisfying the above formula, i.e., a QTE signal is obtained at an output terminal $O_{n2}$.

Figure 2D:
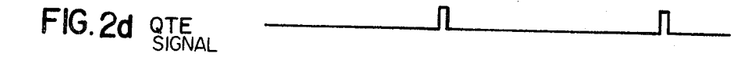
Figure 2E:
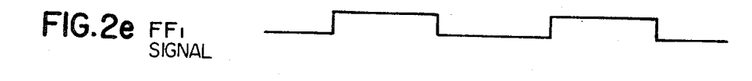
Figure 2F:
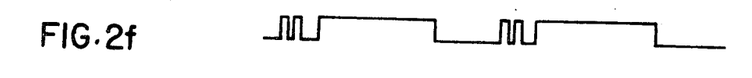
Figure 2G:
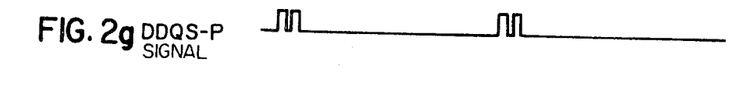
Figure 5:
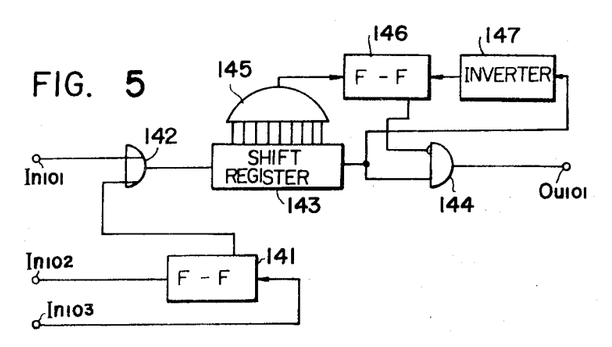

A P-wave counter 4 for counting the number of P-waves in FIG. 1a extracts only P-waves from a cardiac potential and counts them. As disclosed in the aforementioned copending application No. 815,305, the P-wave counter 4 is as shown in FIG. 5. A QRSS signal is fed to a flip-flop 141 through an input terminal $I_{n102}$ to set the flip-flop 141. Then a QTE signal as shown in FIG. 2d is fed to the flip-flop 141 through an input terminal $I_{n103}$ to reset the flip-flop 141 from which a pulse signal, $FF_1$ signal as shown in FIG. 2e, is obtained. An OR-circuit 142 delivers, in response to the $FF_1$ signal and a DDQS signal as shown in FIG. 2b which is fed through an input terminal $I_{n101}$, a signal as shown in FIG. 2f, wherein a QRS wave and a T-wave form a square wave, to a shift register 143 which is set such that the total transmission time is 100 msec. Since the duration of a square signal corresponding to a P-wave in a DDQS signal is usually 100 msec. or less, the square signal passes through the shift register 143 and an AND-circuit 144 to obtain a square signal as shown in FIG. 2g (hereinafter referred to as DDQS-P signal) at an output terminal $Q_{n101}$. In contrast, since the time interval between a QRS wave and a T-wave is usually 300 to 400 msec., and since the transmission time of the shift register is 100 msec., and AND-circuit 145 is inevitably fed with the entire input at the time of the transmission of the square signal composed of the QRS wave and T-wave. As a result a flip-flop 146 is set by an output from the AND-circuit 145, and an output signal from the flip-flop 146 is fed to the inhibit terminal of the AND-circuit 144 to inhibit the input thereof. Consequently, the output terminal $O_{u101}$, but instead the output from the shift register 143 is reversed in its polarity by an inverter 147 and fed to the flip-flop 146 to reset it.

In this manner, only a square signal corresponding to P-waves as shown in FIG. 2g is obtained at the output terminal $O_{u101}$. Thus, the P-wave can be detected. Consequently, if a rise portion of this square wave is employed as a trigger for a monostable multivibrator circuit set at approximately 100 msec. in its duration, the number of P-waves can be obtained by counting the output of the said monostable multivibrator circuit with a counter constituted by a flip-flop circuit. Thus, even if there are two P-waves between successive T- and Q-waves, they can be counted by the counter.

A detector 5 in FIG. 1a for deriving one P-wave from the P-wave counter 4 is constituted by an AND circuit. If there are two P-waves, one output of the counter 4 is inhibited not to generate an output from the AND circuit. Thus, always only signals comprising one P-wave can be detected.

Figure 6:
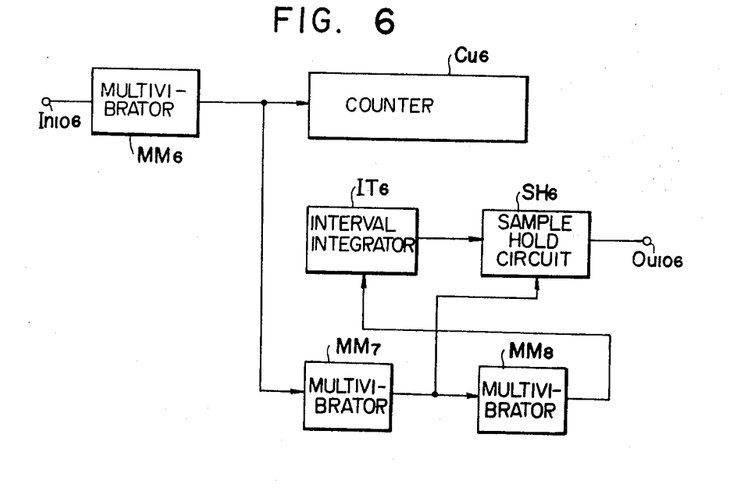

An interval between a P-wave and the next P-wave (PP interval) can be obtained by an arrangement as shown in FIG. 6. A DDQS-P signal as shown in FIG. 2g is fed to a monostable multivibrator $MM_6$ through an input terminal $I_{n106}$ to trigger the multivibrator $MM_6$ with the rise portion of the signal to generate a pulse signal having a duration of 100 msec. which is equal to the width of the P-wave. This pulse signal is fed to a monostable multivibrator $MM_7$, and a pulse signal from the multivibrator $MM_7$ is fed to a sample hold circuit $SH_6$, and another pulse signal therefrom is fed to a monostable multivibrator $MM_8$. As a result, a sample hold circuit $SH_6$ samples to hold the output from an interval integrator $IT_6$ employing a sawtooth wave generating circuit, for example. The held voltage is derived from an output terminal $O_{u106}$. The integrator $IT_6$ is instantaneously reset by the output from the multivibrator $MM_8$ to resume its operation. Thus, by the application of the next DDQS-P signal the integrator $IT_6$ is reset, and the integrated value, i.e., voltage at the time of the reset is sampled to be held by the sample hold circuit $SH_6$ to obtain a voltage representing the interval between a DDQS-P signal and the next DDQS-P signal, i.e., between a P-wave and the next P-wave. $C_{u6}$ in FIG. 6 represents the aforementioned counter for counting the number of P-waves. This counter $C_{u6}$ counts pulse signals from the multivibrator $MM_6$ triggered by a DDQS-P signal.

Figure 7:
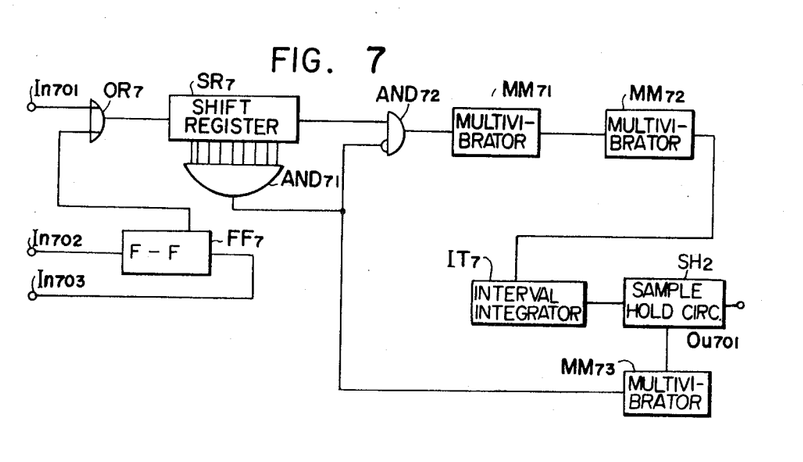

A PQ interval detector 6 in FIG. 1a for detecting the interval between a P-wave and the succeeding Q-wave in a cardiac potential employs an arrangement as shown in FIG. 7. In FIG. 7, $FF_7$ is a flip-flop circuit, $OR_7$ is an OR circuit, $SR_7$ is a shift register (the entire transmission time is set at 100 msec.), and $AND_{71}$ and $AND_{72}$ are AND circuits. Square signals similar to those described with reference to FIG. 5, i.e., signals as shown in FIGS. 2b, 2c, and 2d are fed to the arrangement of FIG. 7 through input terminals $I_{n701}$, $I_{n702}$, and $I_{n703}$ to obtain a DDQS-P signal as shown in FIG. 2g from an AND-circuit $AND_{72}$ with an operation similar to the arrangement of FIG. 5. The rise portion of the DDQS-P signal triggers a monostable multivibrator $MM_{71}$ which in turn triggers another monostable multivibrator $MM_{72}$ by its pulse output. An interval integrator $IT_7$, employing a sawtooth wave generator for example, is instantaneously reset by a pulse output having, for example, a duration of 5 msec. from the multivibrator $MM_{72}$ to resume its operation. The output from the AND-circuit $AND_{71}$ is fed to the inhibit terminal of the AND-circuit $AND_{72}$ and also to a monostable multivibrator $MM_{73}$. Thus, the multivibrator $MM_{73}$ is triggered by the rise portion of a square wave composed of a QRS wave and a T-wave. A sample hold circuit $SH_7$ is operated by a pulse output having a duration of for example, 5 msec. form the multivibrator $MM_{73}$ to provide a voltage corresponding to the output from the integrator $IT_7$, i.e., the interval between a P-wave and a Q-wave at an output terminal $O_{u701}$.

Figure 8:
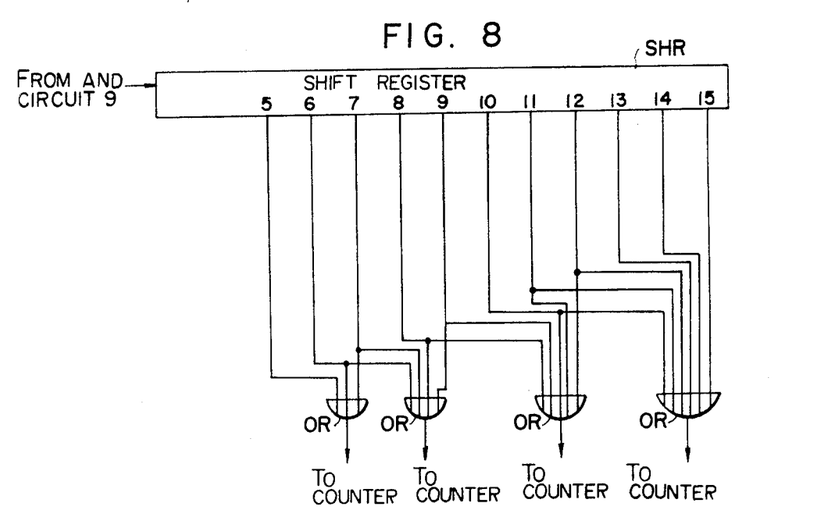

An RR interval detector 7 in FIG. 1a for detecting the interval between R-waves as a voltage has the same arrangement as that of FIG. 3 from which the divider $D_i$ and the monostable multivibrator circuit $MM_3$ are eliminated. The RR interval is detected at the output of the comparator CO as a voltage proportional to the RR interval. Reference numeral 8 designates a counter constituted by a flip-flop for counting the output from the QTE signal generator 3. Reference numeral 9 designates an AND circuit fed with the outputs from the QRS duration detector 2, detector 5 for detecting one P-wave, and QTE signal generator 3 as its inputs. Reference numeral 10 designates an RR interval detector constituted by a shift register SHR and OR-circuits OR as shown in FIG. 8. To classify cardiac cycles according to the RR interval, RR intervals are classified into the following four kinds:

0.5 to 0.7 sec.
0.6 to 0.9 sec.
0.8 to 1.2 sec.
1.0 to 1.5 sec.

In order to determine to which RR interval of the above four kinds a cardiac cycle belongs the shift register SHR in the RR interval detector 10 feeds each OR-circuit OR with a plurality of its outputs to be applied to the preceding stage of an OR circuit together with a plurality of its outputs to be applied to the succeeding stage of an OR circuit as the inputs thereto.

Each of counters 11A to 11D in FIG. 1a is constituted by a flip-flop circuit for counting the output from the RR interval detector 10 and generates an output when it counts a predetermined number or more, for example, four or more. If there occur four or more cardiac cycles belonging to the same RR interval among 16 cardiac cycles to be measured, this implies that there is a basic rhythm because the proportion of the occurrence of cardiac cycles belonging to the same RR interval is four-sixteenths, i.e., 25 percent or more.

Figure 9A:
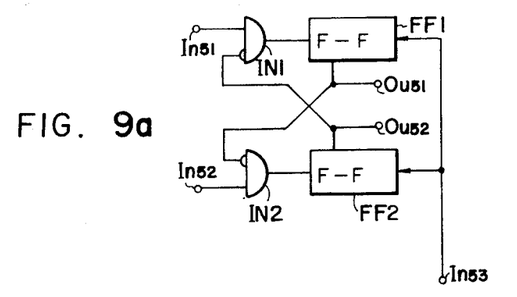

Reference numeral 12 in FIG. 1a designates an OR circuit fed with the outputs from the counters 11A to 11D. Numeral 13 designates a first appearing pulse discriminator for discriminating whether the output from the counter 8 or the output from the OR-circuit 12 is fed earlier thereto. The discriminator 13 is constituted by AND-circuits $IN_1$ and $IN_2$ and flip-flops $FF_1$ and $FF_2$ as shown in FIG. 9a. The flip-flops $FF_1$ and $FF_2$ are supplied with a start signal through an input terminal $I_{ns3}$ to be reset. Therefore, if the output from the OR-circuit 12 is fed to the AND-circuit $IN_1$ through an input terminal $I_{ns1}$, the flip-flop $FF_1$ is set. The output signal from the flip-flop $FF_1$ inhibits the AND-circuit $IN_2$. Thus, an output appears only at an output terminal $O_{ns1}$ to indicate that the output from the OR-circuit 12 is preceding. Conversely, if the output from the counter 8 is fed to the AND-circuit $IN_2$ through an input terminal $I_{ns2}$, output is obtained only at an output terminal of the flip-flop $FF_2$ to indicate that the output from the counter 8 is preceding.

Figure 1B:
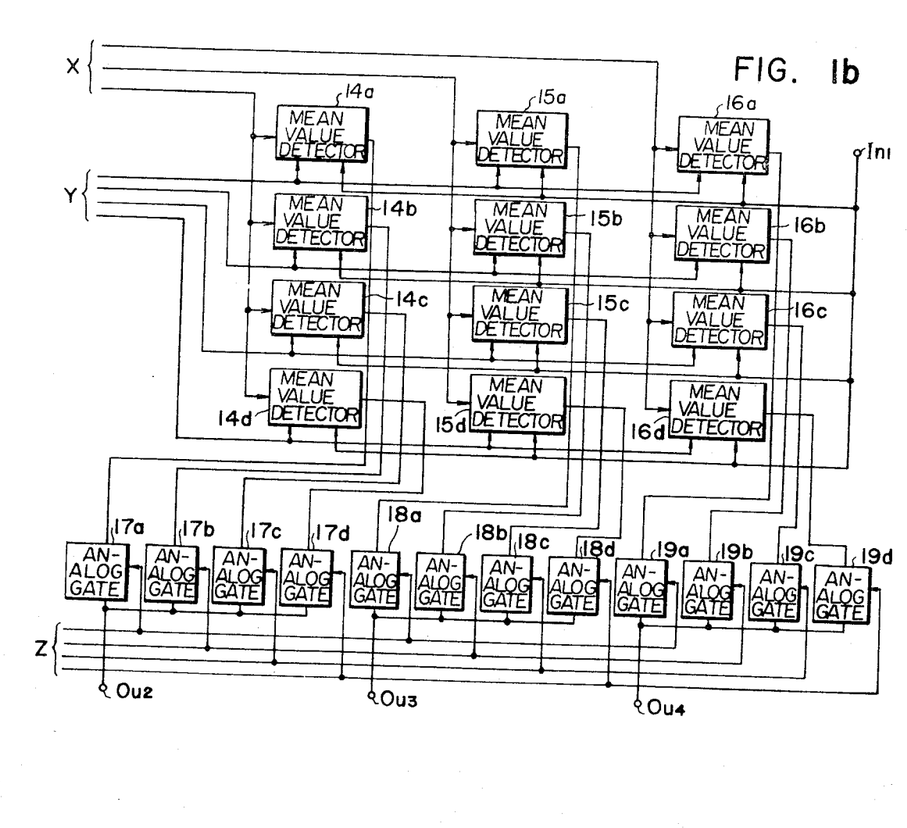
Figure 9B:
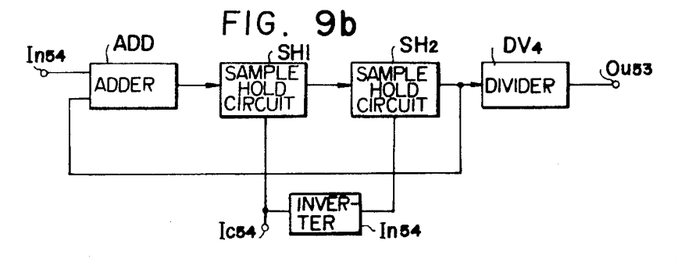

The arrangement of FIGS. 1a and 1b further comprises, as shown in FIG. 1b, mean value detectors 14a to 14d which are fed with the output from the QRS duration detector 1 as their input and which are commanded by the RR interval detector 10 to add the input, mean value detectors 15a to 15d which are fed with the output from the PQ interval detector 6 as their input and commanded by the RR interval detector 10 to add the input, and mean value detectors 16a to 16d which are fed with the output from the RR interval detector 7 as their input and commanded by the RR interval detector 10 to add the input. Each of the mean value detectors is constituted by an adder ADD, sample hold circuits $SH_1$ and $SH_2$, a divider $DV_4$ and an inverter $IN_{s4}$ as shown in FIG. 9b. The said input is fed through an input terminal $In_{s4}$ to the adder ADD, the output of which is sampled and held at the sample hold circuit $SH_1$ in accordance with the addition command signal fed to the sample hold circuit $SH_1$ through an input terminal $I_{cs4}$. The said command signal is reversed in its polarity by the inverter $IN_{s4}$, and hence the output of the sample hold circuit $SH_1$ is not transferred to the sample hold circuit $SH_2$ while the command signal is present. When the command signal is absent, the sample hold circuit $SH_2$ operates to transfer the output of the sample hold circuit $SH_1$ to the sample hold circuit $SH_2$ at which the transferred output is sampled and held and the output of which is fed back to the adder ADD. An input to the adder ADD detected in the next cardiac cycle is added to the preceding input, and the output from the adder ADD is sampled and held at the sample hold circuits $SH_1$ and $SH_2$ according to the command signal, and this operation is repeated for each cardiac cycle. The final output is derived from an output terminal $O_{us3}$, at which time an output divided by the number of times of addition by the divider $DV_4$ is obtained. Reference numerals 17a to 17d in FIG. 1b designate analog gates on-off controlled by the outputs from the counters 11A to 11D to derive the outputs from the mean value detectors 14a to 14d, respectively, Numerals 18a to 18d designate analog gates on-off controlled by the outputs from the counters 11A to 11D to derive the outputs from the mean value detectors 15a to 15d, respectively, and numerals 19a to 19d designate analog gates on-off controlled by the outputs from the counters 11A to 11D to derive the outputs from the mean value detectors 16a to 16d, respectively. $I^n_1$ is a terminal to which a signal for resetting the mean value detectors is fed, $O_{u1}$ is a terminal for deriving the output from the first appearing pulse discriminator 13, and $O_{u2}$ to $O_{u4}$ are output terminals of the analog gates 17a to 17d, 18a to 18d, and 19a to 19d, respectively.

During the operation of the arrangement of FIGS. 1a and 1b, the QRS duration of each cardiac cycle is compared with the QRS duration of the preceding cardiac cycle at the QRS duration detector 2. If the QRS duration is within the normal range of 20 msec., the output from the QRS discriminator 2 is fed to the AND-circuit 9. If the number of P-waves is one, the output of the detector 5 is fed to the AND-circuit 9. Further, the QTE signal indicating the end of each cardiac cycle from the QTE signal generator 3 is fed to the AND-circuit 9. As a result, only a normal cardiac cycle having the QRS duration within the normal range and one P-wave and indicating the end of a cardiac cycle is detected by the AND-circuit 9. Since the output from the AND-circuit 9 corresponding to each cardiac cycle is fed to the RR interval detector 10, the periodicity of the output of the AND-circuit 9 is detected by the RR interval detector 10. The cardiac cycles detected and classified in the RR interval detector 10 are counted by the corresponding counters 11A to 11D, respectively. At the same time the outputs from the QRS duration detector 1, PQ interval detector 6, and RR interval detector 7 are fed to the mean value detectors 14a to 14d, 15a to 15d, and 16a to 16d, respectively, and the classified outputs from the RR interval detector 10 are fed to the mean value detectors 14a, 15a, 16a; 14b, 15b, 16b; 14c, 15c, 16c; and 14d, 15d, 16d, respectively, as their addition command signals. Each mean value detector receiving the addition command signal performs the addition of the QRS durations, PQ intervals or RR intervals to generate an output of $1/n$ of the added value, where $n$ is the number of times of addition.

The counters 11A to 11D generate output signals when they count four outputs each from the RR interval detector 10, and open the analog gates 17a to 19d to derive the outputs from the corresponding mean value detectors 14a to 16d as values of the basic rhythm. For example, the counter 11C for counting the outputs from the RR interval detector 10 corresponding to the time of 0.8 to 1.2 sec. generate an output signal when it counts four outputs. This output signal opens the analog gates 17c, 18c, and 19c to obtain a mean QRS duration, a mean PQ interval, and a mean RR interval from the mean value detectors 14c, 15c, and 16c at the output terminals $O_{u2}$, $O_{u3}$, and $O_{u4}$, respectively.

The just described operation is effective when a signal is obtained from the output terminal of the first appearing pulse discriminator 13. Since the output signal from the QTE signal generator 3 is also fed to the counter 8, the counter 8 counts the number of the cardiac cycles. If the counter 8 is set such that it generates an output signal when it counts 16 cardiac cycles, the output signal is fed to the first appearing pulse discriminator 13 when the counter 8 counts 16 cardiac cycles. The first appearing pulse discriminator 13 is also fed with the output from the OR-circuit 12. Since the OR-circuit 12 generates an output signal when four signals from the counter 11A to 11D are present, if the output signal from the OR-circuit 12 appears earlier than the output signal from the counter 8, it means that four cardiac cycles out of the 16 cardiac cycles belong to one of the classified RR intervals, that is, it is considered that four-sixteenths, i.e., 25 percent or more of similar cardiac cycles are present. Since this is considered to be the aforementioned basic rhythm, the QRS duration, PQ interval and RR interval obtained at the output terminals $O_{u2}$ to $O_{u4}$ are values when the cardiac action has the basic rhythm. When the output signal from the counter 8 appears earlier than the output signal from the OR-circuit 12, the first appearing pulse discriminator 13 generates no output signal, in which case it is considered that there is no basic rhythm. In this case the counters 11A to 11D generate no output, and hence no QRS duration, PQ interval, and RR interval are obtained.

The criterion of whether or not there is a basic rhythm and the classification of the RR intervals are determined by experience of clinical diagnosis.

In this manner, when there is the basic rhythm in the cardiac action of several cycles, the QRS duration, PQ interval and RR interval in the cardiac cycle are detected as mean values over several cardiac cycles. Then, the QRS duration, PQ interval, and RR interval on the electrocardiogram of a test subject are compared with those of the basic rhythm to diagnose a heart disease. In this case, since it has been known by experience of diagnosis that when what relation is there between the detected values of the basic rhythm and the detected values of a subject, what disease it indicates, the characteristics represented by the relation between the detected values of the basic rhythm and the subject are coded. The diagnosis of a heart disease is done by a combination of the coded relations.

In the table of FIG. 16, $RR_B$ represents the amount of RR interval in the basic rhythm, and $RR_n$ represents that of a subject. When $RR_n$ and $RR_B$ have, for example, a relation $RR_n/RR_B < 0.85$, then the RR interval is coded as $RB_{es}$, and the case $1.2 > RR_n/RR_B > 0.85$ is coded as $RB_n$. $R_{BI}$ and $R_{BII}$ are codes when the relations shown in FIG. 16 are satisfied.

$n_p$ represents the number of P-waves, and when $n_p = 1$, that is, when there is the basic rhythm, the $n_p$ is coded as $I_{p1}$, and according to the number of $n_p$ it is coded as $I_{p0}$, $I_{p2}$, and $I_{p3}$ as shown in the table of FIG. 16.

PP represents the interval between P-waves of one cardiac cycle and the next cardiac cycle, and when it satisfies, for example, a relation $PP \leq 0.3$ sec., it is coded as $PP_s$. $PP_n$ is also a code when it satisfies the relation shown in FIG. 16.

$PQ_B$ is the amount of the PQ interval of the basic rhythm, $PQ_n$ is that of the subject, and $PQ_{n-1}$ is that in the preceding cardiac cycle of the subject. When $PQ_n$ and $PQ_{n-1}$ have a relation $|PQ_n - PQ_{n-1}| \leq 20$ msec., it is coded as $PQ_d$, and $PQ$, $PQ_s$, $PQ_{Bn}$, and $PQ_{Ba}$ are codes when they have the relations shown in FIG. 16.

$QRS_{dB}$ is the amount of the QRS duration of the basic rhythm, $QRS_{dn}$ is that of the $n$th cardiac cycle of the subject, and $QRS_{n-1}$ is that of the $(n-1)$th cardiac cycle of the subject. When these quantities satisfy the relations shown in FIG. 16, the QRS duration is coded as $QD_n$, $QD_a$, $QDA_n$, $QDA_w$, $QDB_n$, and $QDB_a$.

Since the codes $RB_{Is}$, $RB_{II}$, $RB_I$, and $RB_{II}$, for example, are for the cases where $$RB_{Is} : RR_n < 0.85 RR_B \tag{1}$$
$$RB_n : 1.2 > RR_B > RR_n > 0.85 RR_B \tag{2}$$
$$RB_I : 1.8 > RR_B > RR_n > 1.2 RR_B \tag{3}$$
$$RB_{II} : RR_n > 1.8 RR_B \tag{4}$$

are satisfied as seen from FIG. 16, these codes can be obtained by appropriately combining the following formulas:

$$RR_n < 0.85 RR_B \tag{5}$$
$$RR_n > 1.2 RR_B \tag{6}$$
$$RR_n < 1.8 RR_B \tag{7}$$

Figure 10:
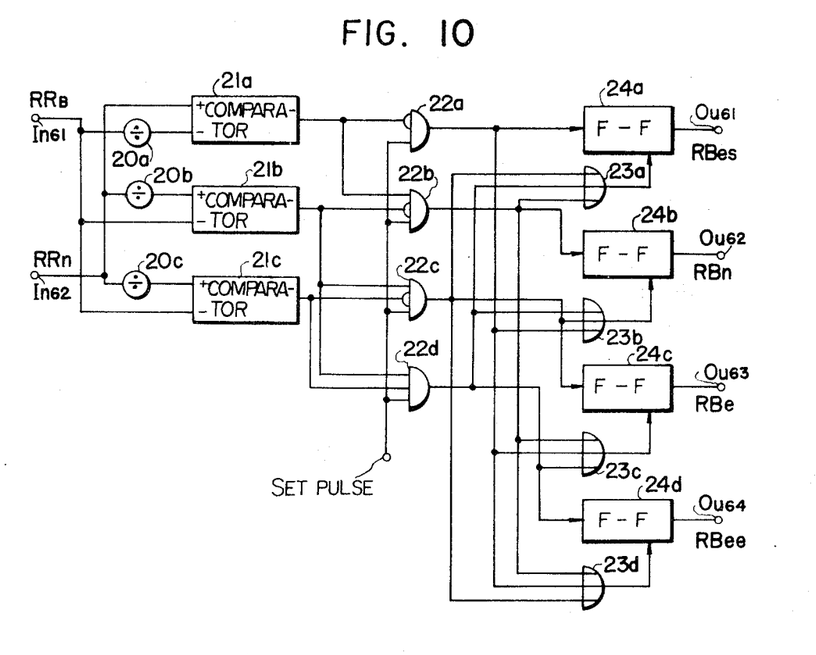
FIGS. 10 to 13 are block diagrams of various parts of an embodiment of the invention.

In the present invention, the combinations of these formulas are realized by an arrangement as shown in FIG. 10. $RR_B$ is fed to comparators 21a to 21c through an input terminal $In_{61}$, at which time $RR_B$ fed to the comparator 21a is multiplied by 0.85 by a divider 20a. The comparators 21a to 21c are also fed with $RR_n$ through another input terminal $In_{62}$, at which time $RR_n$ fed to the comparator 21b is multiplied by 1/1.2 by a divider 20b, and RR fed to the comparator 21c is multiplied by 1/1.8 by a divider 20c. As a result, the comparators 21a to 21c generate output signals when they satisfy formulas (5) to (7), respectively. The output signal from the comparator 21a is fed to an AND-circuit 22a as an inhibit input signal. The output signal from the AND-circuit 22a is fed to a flip-flop 24a and OR-circuits 23b to 23d. The flip-flop 24a is set by the output signal from the AND-circuit 22a to provide an output signal representing the code $RB_{Is}$ at an output terminal $O_{u61}$. An AND-circuit 22b is fed with the outputs from the comparators 21a and 21b, but the output from the comparator 21b is an inhibit input to the AND-circuit 22b, that is, formula (7) is not satisfied. The output signal from the AND-circuit 22b is fed to a flip-flop 24b and the OR-circuits 23a, 23c, and 23d. The flip-flop 24b is set by the output signal from the AND-circuit 22b to provide an output signal representing the code $RB_n$ at an output terminal $O_{u62}$. Since an AND-circuit 22c is fed with the outputs from the comparators 21b and 21c, formulas (6) and (7) are satisfied. The output signal from the AND-circuit 22c is fed to a flip-flop 24c and the OR-circuits 23a, 23b, and 23d. The flip-flop 24c is set by the output signal from the AND-circuit 22c to provide an output signal representing the code $RB_I$ at an output terminal $O_{u63}$. A flip-flop 24d is fed with the output from an AND-circuit 22d as its input signal which does not satisfy formula (7), that is, indicates $RR_n > 1.8 RR_B$. As a result, formula (6) represented by the output signal of the comparator 21b is neglected. The flip-flop 24d is set by the output signal from the AND-circuit 22d to provide an output signal representing the code $RB_{II}$ at an output terminal $O_{u64}$.

Since formulas $$|PQ_n - PQ_B| \leq 20 \text{ msec.} \tag{8}$$
$$|PQ_n - PQ_B| > 20 \text{ msec.} \tag{9}$$

have only to be satisfied to obtain $PQ_{Bn}$ and $PQ_{Ba}$, respectively, as seen from FIG. 16, the following formulas $$PQ_n - PQ_B < 20 \text{ msec.} \tag{10}$$
$$\therefore PQ_n < PQ_B + 20 \text{ msec.} \tag{11}$$

can be obtained from formula (8) if $PQ_n > PQ_B$, and the following formulas $$PQ_B - PQ_n < 20 \text{ msec.} \tag{12}$$
$$\therefore PQ_B < PQ_n + 20 \text{ msec.} \tag{13}$$

can be obtained if $PQ_n < PQ_B$. When formulas (11) and (13) are satisfied, $PQ_{Bn}$ is obtained, otherwise $PQ_{Ba}$ is obtained.

Figure 11:
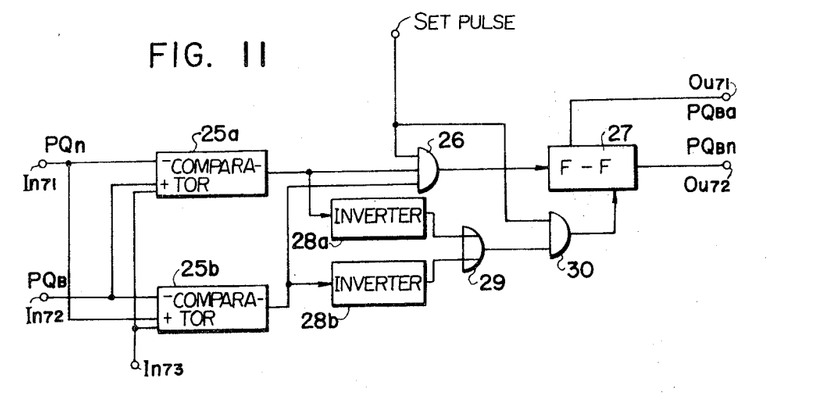

Therefore, if a comparator 25a is fed with a voltage corresponding to 20 msec., $PQ_B$, and $PQ_n$ through input terminals $In_{73}$, $In_{72}$, and $In_{71}$, respectively, and if a comparator 25b is fed with the voltage corresponding to 20 msec., $PQ_n$, and $PQ_B$ through the input terminals $In_{73}$, $In_{71}$, and $In_{72}$ respectively, as shown in FIG. 11, the comparator 25a generates an output signal when it satisfies formula (11) and the comparator 25b generates an output signal when it satisfies formula (12). When the comparators 25a and 25b generate the output signals simultaneously, both these signals are fed to an AND-circuit 26, the output signal of which sets a flip-flop to obtain $PQ_{Bn}$ at an output terminal $O_{u71}$. When no output signal is obtained at the terminal $O_{u72}$, the comparators 25a and 25b are in a 0 state. In this case, the output signals from the comparators 25a and 25b are converted by inverters 28a and 28b into signals in 1 state. The output signals from the inverter 28a and 28b are fed to an OR-circuit 29, the output signal of which is fed to an AND-circuit 30. The flip-flop 27 is reset by the output signal from the AND-circuit 30. The flip-flop 27 is reset by the output signal from the AND-circuit 30. The flip-flop 27 is reset by the output signal from the AND-circuit 30 to provide $PQ_{Bn}$ at an output terminal $O_{u72}$ and $PQ_{Ba}$ at the output terminal $O_{u71}$.

By replacing $PQ_n$ and $PQ_B$ by $QRS_{dn}$ and $QRS_{dB}$, respectively, in the above description the codes $QDB_n$ and $QDB_a$ can be obtained.

The other codes shown in FIG. 16 can also be obtained by similar means except that for P+ and P−, which are the codes of positive and negative polarities of the P-wave, a combination of output signals from Schmitt trigger circuits having positive and negative thresholds and the first appearing pulse discriminator shown in FIG. 9a are employed.

Diagnosis of arrhythmia by the use of the codes obtained in the manner as described above is done by combining the codes. As an example, diagnosis of arrhythmia resulting from an atrio-ventricular block or a ventricular extrasystole will be described. As regards the atrio-ventricular block, since the stimulation produced at the sinus node is blocked at the atrio-ventricular node in the course of transmission from the atrium to the ventricle, there occur two, sometimes three, P-waves, the RR interval is very long compared with $RR_B$, and yet the QRS duration and the PQ interval are invariant. Therefore, if this atrio-ventricular block occurs, the code is the com combination of $RB_{II}$ or $RB_I$, $IP_2$ or $IP_3$, $PQ_{Bn}$, and $QDB_n$ (shown by the mark X in FIG. 16). In case the ventricular extrasystole occurred subsequent to the cardiac action having the basic rhythm, a stimulation occurs in the ventricle. In this case, since the atrium does not contract, the RR interval is short, and the QRS duration is long, the code is a combination of $RB_{Is}$, $IP_0$, and $QDB_a$ (shown by the mark X in FIG. 16). In this manner other arrhythmias also can be diagnosed by the combination of codes as indicated by the mark X in FIG. 16.

Figure 12:
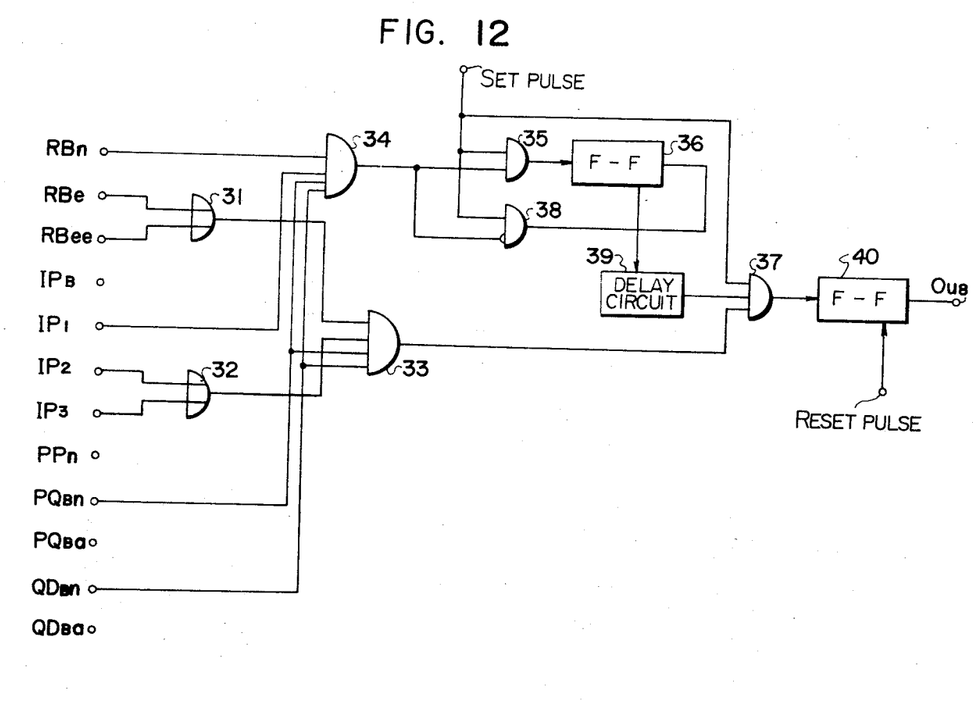

For the combination of codes for the atrio-ventricular block an arrangement as shown in FIG. 12 is employed. Signals representing the codes $RB_I$ and $RB_{II}$ are fed to an OR-circuit 31, and signals representing the codes $I_{p2}$ and $I_{p3}$ are fed to an OR-circuit 32. The output signals from these OR-circuits 31 and 32 and signals representing the codes $PQ_{Bn}$ and $QD_{Bn}$ are fed to an AND-circuit 33. Signals representing the codes $R_{Bn}$, $I_{p1}$, $PQ_{Bn}$, and $QD_{Bn}$ which represent cardiac cycles substantially equal to the basic rhythm (sinus arrhythmia) are fed to an AND-circuit 34, the output of which is fed to an AND-circuit 35. A flip-flop 36 is set by the output from the AND-circuit 35. The output of the AND-circuit 33 is fed to an AND-circuit 37, at which time the flip-flop 36 is reset by the output of an AND-circuit 38 to feed the output thereof to the AND-circuit 37 through a delay circuit 39 where the output from the flip-flop 36 is delayed. The output from the AND-circuit 37 sets a flip-flop 40 to cause it to deliver an output signal to an output terminal $O_{u8}$. That is, the output signal is obtained by the fact that the codes representing the basic cardiac action are converted into the codes representing the atrio-ventricular block. By this output signal the atrio-ventricular block can be diagnosed. Incidentally, the flip-flop 40 is adapted to be reset by a reset pulse so that the AND-circuits 35, 37, and 38 generate output signals synchronously with the reset pulse.

Figure 13:
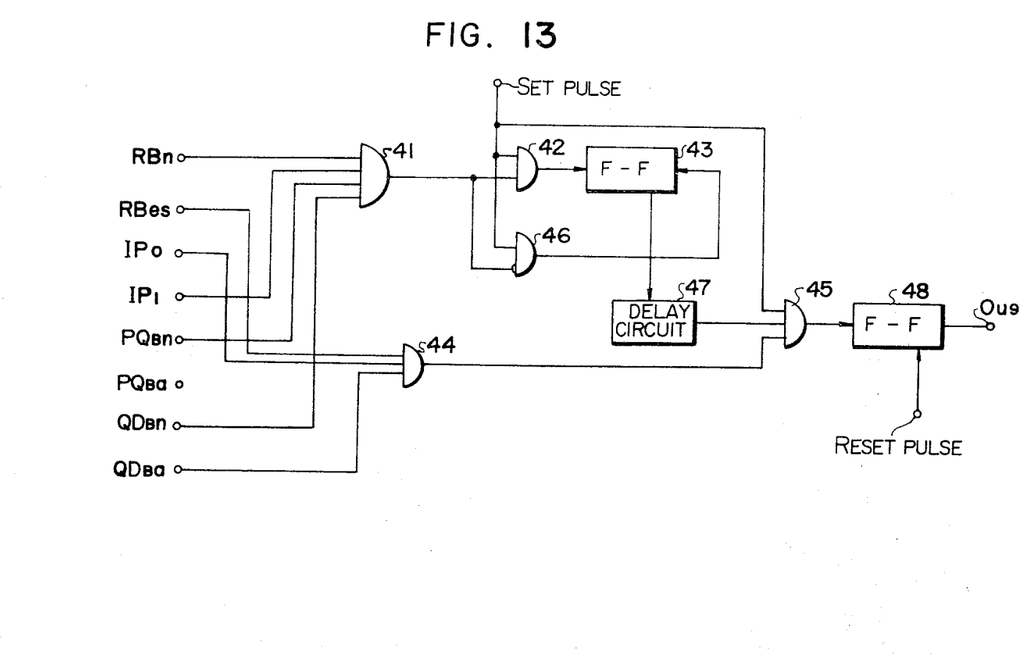

Since the ventricular extrasystole occurs subsequently to the cardiac cycle having the basic rhythm, the signals of the codes representing the ventricular extrasystole are obtained in such a manner as described above. When each code is converted from $RB_n$ into $RB_{ls}$, from $IP_1$ into $IP_o$, and from $QD_{Bn}$ into $QDB_a$, the cardiac action is determined as a ventricular extrasystole. In FIG. 13, signals respectively representing the codes $RB_n$, $IP_1$, $PQ_{Bn}$, and $QD_{Bn}$ are fed to an AND-circuit 41, the output signal of which is fed to an AND-circuit 42. A flip-flop 43 is set by the output signal from the AND-circuit 42. Signals respectively representing the codes $RB_{ls}$, $IP_o$, and $QD_{Ba}$ are fed to an AND-circuit 44, the output signal of which is fed to an AND-circuit 45. At this time the flip-flop 43 is reset by the output signal of an AND-circuit 46. The output signal from the flip-flop 43 is delayed by a delay circuit 47 and then fed to the AND-circuit 45. A flip-flop 48 is set by the output signal from the AND-circuit 45 to deliver an output signal to an output terminal $O_{u9}$. By this output signal the ventricular extrasystole can be diagnosed.

The other heart diseases relating to arrhythmia shown in FIG. 16 can be diagnosed in a similar manner.

Hereinabove only the cases where the frequency of the arrhythmia is low have been described. However, the present invention can also be applied to the cases where the basic rhythm cannot be detected, that is, the frequency of the arrhythmia is high.

In the case where the frequency of the arrhythmia is high, the number of P-waves, the PQ interval, the QRS duration, and the RR interval in a few, for example four, cardiac cycles in which the arrhythmia occurs are coded in a manner similar to the case where the frequency of the arrhythmia is low. In this case, however, the coding is made with respect to the comparison not with the basic rhythm, but with the preceding cardiac cycle. By simultaneously performing the comparison of the coded RR interval, PQ interval, and QRS duration heart diseases can be diagnosed. That is, a signal corresponding to each code is fed to a shift register which successively stores the signal corresponding to the code associated with each cardiac cycle. Then the contents stored in the registers are simultaneously compared.

Figure 14:
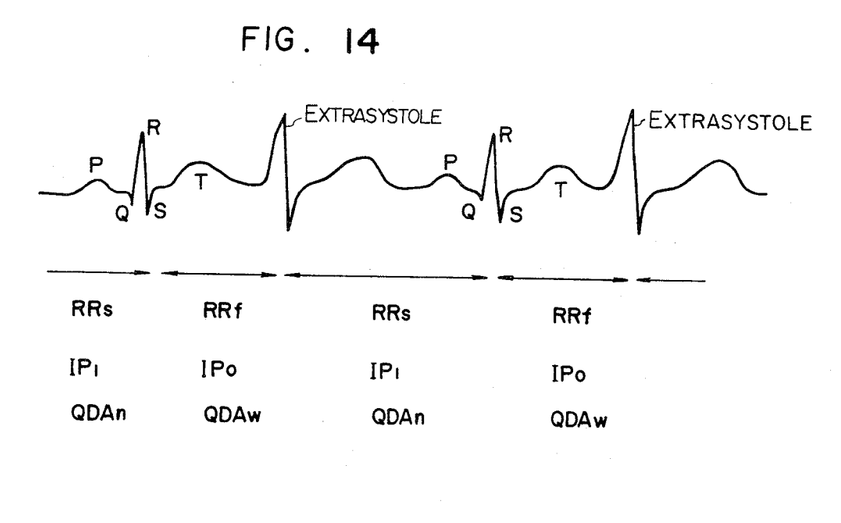
FIG. 14 is a waveform of cardiac potential of arrhythmia.

For example, for a bigeminy ventricular extrasystole in which an extrasystole occurs at each cardiac cycle as shown in FIG. 14, the RR interval is successively coded as $RR_s$, $RR_f$, $RR_s$, $RR_f$. If the RR interval in the $n$th cardiac cycle is represented by $RR_n$, and that in the $(n-1)$th cardiac cycle is represented by $RR_{n-1}$, the RR interval is coded as $RR_s$ when $RR_n$ and $RR_{n-1}$ satisfy the relation $RR_n/RR_{n-1} > 1.2$, and coded as $RR_f$ when $RR_n$ and $RR_{n-1}$ satisfy the relation $RR_n/RR_{n-bh1} > 0.85$.

The codes of the number $n_p$ of P-waves are $IP_1$ and $IP_o$. $IP_1$ is when $n_p$ is 1, and $IP_o$ is when $n_p$ is 0. The QRS duration is coded as $QDA_n$ when the QRS duration $QRS_{dn}$ of the $n$th cardiac cycle satisfies a relation $QRS_{dn} = 0.12$ sec., and coded as $QDA_w$ when a relation $QRS_{dn} = 0.12$ sec. is satisfied. Therefore, in the case of the said bigeminy ventricular extrasystole shown in FIG. 14, the said codes change as $RR_f \rightarrow RR_s \rightarrow RR_f \rightarrow RR_s$,
$IP_o \rightarrow IP_1 \rightarrow IP_o \rightarrow IP_1$,
$QDA_w \rightarrow QDA_n \rightarrow QDA_w \rightarrow QDA_n$ for four successive cardiac cycles. In other words, when the code of the RR interval is $RR_f$, the code of the number of the P-waves is $IP_o$, and the code of the QRS duration is $QDA_w$. When the code of the RR interval is $RR_s$, the code of the number of the P-waves is $IP_1$, and the code of the QRS duration is $QDA_n$. Therefore, when these changes of the codes occur simultaneously, the presence of the bigeminy ventricular extrasystole is determined.

Consequently, if signals representing the said codes are fed to shift registers, the content of the shift register fed with the signal representing $RR_f$ is (1010), the content of the shift register fed with the signal representing $RR_s$ is (0101), the content of the shift register fed with the signal representing $IP_o$ is (1010), and the content of the shift register fed with the signal representing $IP_1$ is (0101). Therefore, when the said contents of the shift registers are simultaneously present, the presence of the bigeminy ventricular extrasystole is determined.

Figure 15:
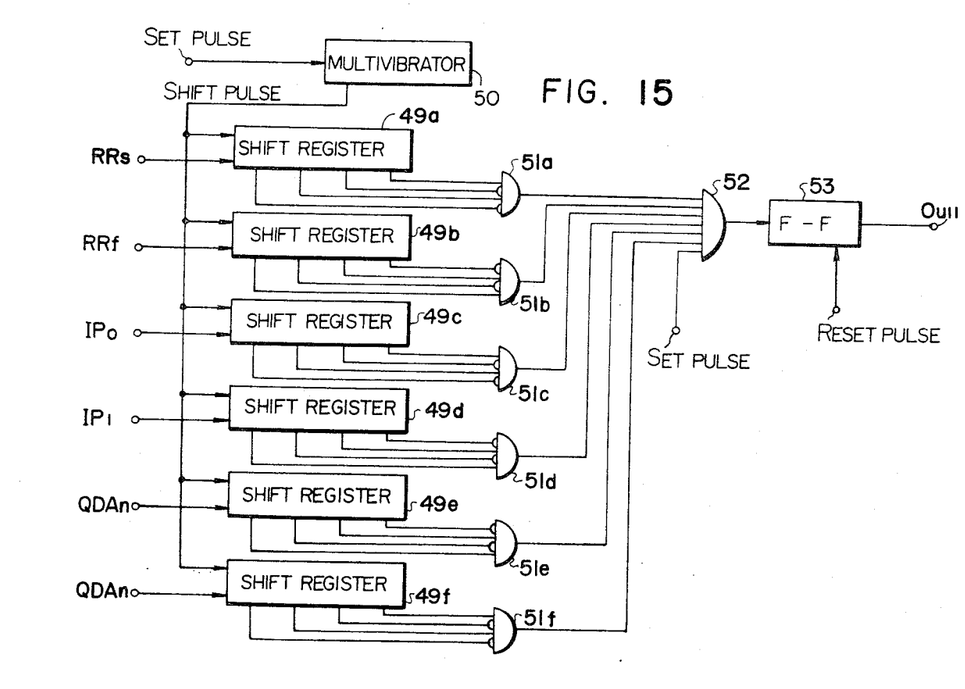
FIG. 15 is a block diagram of a significant part of an embodiment of the invention.

Referring to FIG. 15, signals representing the codes $RR_s$, $RR_f$, $IP_o$, $IP_1$, $QDA_n$, and $QDA_w$ are fed to shift registers 49a to 49f, respectively. These input signals are successively shifted by the application of the output signal from a monostable multivibrator circuit 50 triggered by a set pulse indicating the end of each cardiac cycle, for example, by a QTE signal indicating the end of a T-wave. The output signals from the shift registers 49a to 49f are fed to AND-circuits 51a to 51f, respectively. When the contents of the shift registers 49a to 49f are (0101), (1010), (0101), (1010), (1010), and (0101), the AND circuits generate their output signals which are fed to an AND-circuit 52. A flip-flop 53 is set by the output signal from the AND-circuit 52 to deliver an output signal to an output terminal $O_{u11}$. By this output signal the presence of the bigeminy ventricular extrasystole is determined. The AND-circuit 52 is set by the application of a set pulse. The flip-flop 53 is reset by a reset pulse applied at the time of the start of the detection.

The number of cardiac cycles employed for the detection is not limited to four, but may be varied according to the heart disease.

Thus, the diagnosis of the bigeminy ventricular extrasystole is made possible. Other heart diseases due to arrhythmia of high frequency can also be diagnosed by coding the characteristics as to the RR interval, QRS duration, the number of P-waves, PQ interval, the polarities of P-waves, etc. obtained by experience of clinical diagnosis, and by combining the codes over several cardiac cycles.

As has been stated hereinabove, according to the invention the diagnosis of various heart diseases has become possible. Furthermore, the present invention has the advantages that mass examination of heart diseases is possible in view of a rapid increase of such diseases, and that the monitoring of the cardiac action in and after operation is possible.

We claim:

1. An automatic arrhythmia diagnosing system for determining characteristics of a cardiographic signal which includes P-, Q-, R-, S-, and T-wave portions comprising:

first means for detecting each of said wave portions of said cardiographic signals;

second means, responsive to said first means, for measuring the width of a QRS wave, the interval between the P-wave and a Q-wave, the number of P-waves, the polarities of the P-waves from each of said first and second cardiac cycles of a test subject and the interval between respective R- and P-waves of a first and second cardiac cycle;

third means, responsive to said measuring means, for producing a plurality of measurement signals representative of said wave measurements indicative of clinical diagnostic characteristics of a heart disease, and fourth means, responsive to said measurement signal producing means, for logically combining said plurality of signals in accordance with specific relationships corresponding to symptoms of a predetermined heart disease.

2. An automatic arrhythmia diagnosing system according to claim 1, further comprising seventh means, responsive to said first means, for converting said wave portions into respective rectangular waves and eighth means, responsive to said second and said seventh means, for generating a signal corresponding to said interval between P-waves including a first monostable multivibrator circuit for generating a pulse output having a duration of approximately 100 msec. and being triggered by the first rise part of the rectangular waves representative of a P-wave of a cardiac potential, a second multivibrator, triggered by the pulse output of said first multivibrator, producing a plurality of pulse outputs, a sample holding circuit supplied with one of the pulse outputs from said second monostable multivibrator as a control signal, a third monostable multivibrator triggered by the other of said pulse outputs from said second monostable multivibrator, and a voltage generator reset by a pulse output of said third monostable multivibrator, said sample holding circuit being controlled by said one of said pulse outputs from said second monostable multivibrator to sample and hold the output voltage from said voltage generator, said voltage generator being instantaneously reset by said pulse output of said third monostable multivibrator to resume its operation.

3. An automatic arrhythmia diagnosing system according to claim 1, comprising seventh means responsive to said first means for converting said wave portions into respective rectangular waves and ninth means responsive to said second and seventh means for generating a signal corresponding to said interval between said P- and Q-waves including a first monostable multivibrator circuit for generating a pulse output having a duration of approximately 100 msec. and triggered by the first rise pulse of the rectangular waves representative of a P-wave of a cardiac potential, a second multivibrator triggered by the pulse output from said first monostable multivibrator, a voltage generator reset by an output from said second monostable multivibrator to momentarily interrupt and then resume its operation, a third monostable multivibrator triggered by the rise part of a rectangular wave representative of the part from said Q-wave to said T-wave of a cardiac potential, and a sampling and holding circuit for sampling and holding the output of said voltage generator controlled by an output of said third monostable multivibrator.

4. An automatic arrhythmia diagnosing system according to claim 1, comprising seventh means responsive to said first means for converting said wave portions into respective rectangular waves and tenth means responsive to said second and seventh means for generating a signal corresponding to said interval between R-waves including a first monostable multivibrator triggered by a rectangular signal representative of an R-wave of cardiac potential producing a pair of outputs, a second monostable multivibrator triggered by one of the outputs of said first monostable multivibrator, a voltage generator instantaneously reset by an output of said second monostable multivibrator to resume its operation, a sampling and holding circuit for sampling and holding the output of said voltage generator controlled by the other of said outputs of said first monostable multivibrator and a comparator for receiving as its two inputs the output of said sampling and holding circuit and the outputs of said voltage generator, said comparator generating a voltage when its two inputs are equal to each other.

5. A system in accordance with claim 1, further comprising fifth means, responsive to said first means, for determining a predetermined number of cardiac cycles, having a basic rhythm, and further comprising sixth means responsive to said second means for generating signals representative of the mean values of the width of the QRS wave, the interval between the P- and Q-waves, and the interval of the R-waves.

6. An automatic arrhythmia diagnosing system according to claim 5, comprising means for detecting said basic rhythm from cardiac cycles of said test subject including a shift register having a predetermined number of stages for receiving as an input signal a normal cardiac cycle having one P-wave and one QRS wave the width of which is equal to that of a preceding cardiac cycle in a predetermined number of cardiac cycles of said test subject, a plurality of first OR circuits each for receiving as its input signals outputs from predetermined stages of said shift register, a plurality of first counters for counting a predetermined number of output signals from each of said first OR circuits, a counter OR circuit for receiving all outputs from said first counters, a second counter for counting said predetermined number of cardiac cycles of said test subject, and a first appearing pulse discriminator for discriminating one from the other of the output signal from said second counter and the output signal from said counter OR circuit, said shift register successively generating output signals within the time interval between R-waves predetermined by the number of stages and the feed time of said shift register, each of said first OR circuits receiving a part of the input signals of the immediately preceding one of said first OR circuits.

7. An automatic arrhythmia diagnosing system according to claim 6, wherein said first appearing pulse discriminator comprises a first AND circuit having an inhibit terminal and an input terminal, a first flip-flop circuit connected with said first AND circuit, a second AND circuit having an inhibit terminal and an input terminal, and a second flip-flop circuit connected with said second AND circuit, said first flip-flop circuit generating an output when an output from said counter OR circuit is applied to said input terminal of said first AND circuit, a part of said output from said first flip-flop circuit being derived from an output terminal thereof, the remaining part of said output from said first flip-flop circuit entering said inhibit terminal of said second AND circuit to inhibit said second AND circuit, said second flip-flop circuit generating an output when an output from said second counter is applied to said input terminal of said second AND circuit, a part of said output from said second flip-flop circuit being derived from an output terminal thereof, the remaining part of said output from said second flip-flop circuit entering said inhibit terminal of said first AND circuit to inhibit said first AND circuit.

8. A system in accordance with claim 6, wherein said mean value signal generating means comprises an adder circuit having a pair of inputs, one of which receives signals indicative of the width of said QRS waves, a pair of sample hold circuits connected in series and being supplied the output of said adder circuit, a divider circuit connected to the output of said series connected sample hold circuits, a feedback circuit connected as one input of said adder circuit from the output of said series connected sample hold circuit, a controlled input for each of said sample hold circuits, one of which is connected to a control input terminal means, for supplying a control input signal to said control input terminal, and the other of which is connected to said control input terminal through an inverter circuit.

9. A system in accordance with claim 8, further including a plurality of analog gates, respectively connected to the outputs of said mean value signal generating means and responsive to the output of said plurality of first counters for obtaining a mean value QRS duration, a mean PQ interval and a means PR interval.

10. A system in accordance with claim 1, wherein said logically combining means comprises first logic means for generating a first plurality of code signals, including a plurality of divider circuits receiving RR integral signals, a plurality of comparator circuits corresponding in number to the number of divider circuits, and being connected in series therewith and receiving at one respective input the output of the respective divider circuit and another respective input a preselected RR interval signal, a set of logical AND gates connected to the outputs of said comparator circuits and to a control input therefor for receiving a gate energizing signal, and a plurality of logic storage circuits connected to the outputs of said AND gates for registering a first set of code signals.

11. A system in accordance with claim 10, wherein said logically combining means further comprises second logic means for generating second code signals representative of a second set of diagnostic characteristics, said second logic circuit means comprising a pair of comparator circuits for comparing a plurality of PQ interval signals, a pair of interter circuits, receiving the outputs of said comparator circuits, a storage flip-flop being logically connected to said comparator circuits and means for logically connecting said inverter circuits to said storage flip-flop and for connecting the outputs of said comparator circuits to said storage flip-flop, comprising a set of second logic AND gates, the control inputs of which are connected to a means for supplying said control inputs with a common control signal.

12. A system in accordance with claim 11, further comprising means for combining the outputs of said first and second logic means, comprising a first plurality of OR gates and a set of combining AND gates connected in series therewith, an output AND gate for receiving the outputs of said combining AND gates, said output AND gate further including a control input and a means for supplying a pulse to energize said control input and delayed storage input and further comprising a storage flip-flop connected to one of said combining AND gates and a delay circuit connected in series therewith for supplying said delayed storage input, and a combining output logic storage flip-flop connected to said output AND gates for delivering an output signal whereby atrio-ventricular block can be diagnosed.

13. A system in accordance with claim 1, including coding means responsive to said first means for generating coded signals representative of coded portions of said cardiac wave signal and wherein said logically combining means comprises a plurality of shift register means, connected to said coding means to receive a plurality of signals representative of coded portions of said cardiac wave signal, a triggering multivibrator, connected in parallel to the inputs of each of said shift registers, a first plurality of shift register output gates connected to each respective shift register, and a combining output shift register AND gate connected to each of the outputs of each of said shift register output gates, and an output register flip-flop, for providing a signal indicative of the presence of bigeminy ventricular extrasystole.

* * * * *